May 30, 1933.　　　E. F. WATERBOR　　　1,912,110
VEHICLE WHEEL
Filed June 6, 1931　　　3 Sheets-Sheet 1
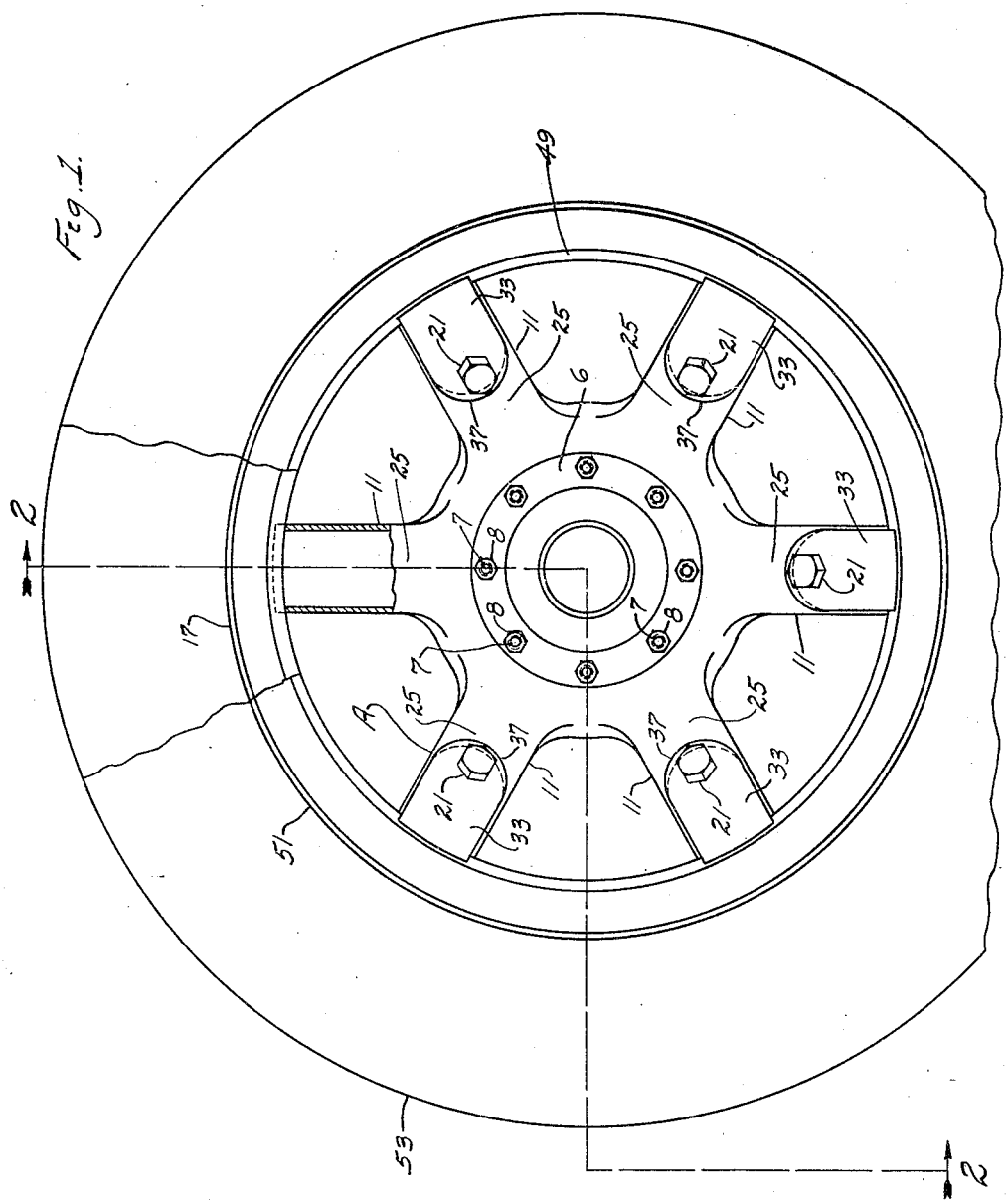
INVENTOR
Elmer F. Waterbor,
BY
George B. Ingersoll.
ATTORNEY May 30, 1933.    E. F. WATERBOR    1,912,110
VEHICLE WHEEL
Filed June 6, 1931    3 Sheets-Sheet 2
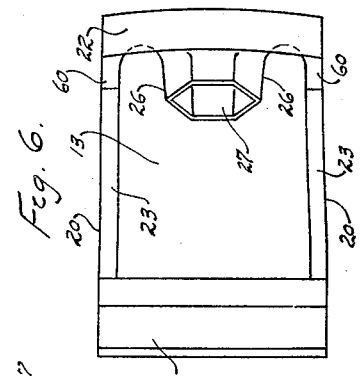
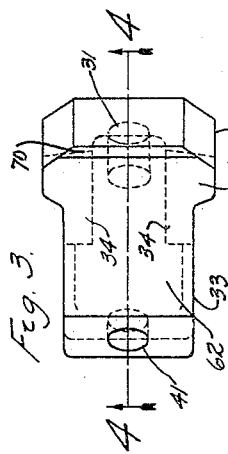
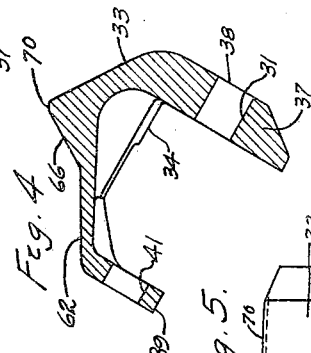
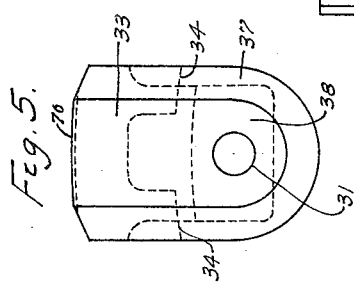
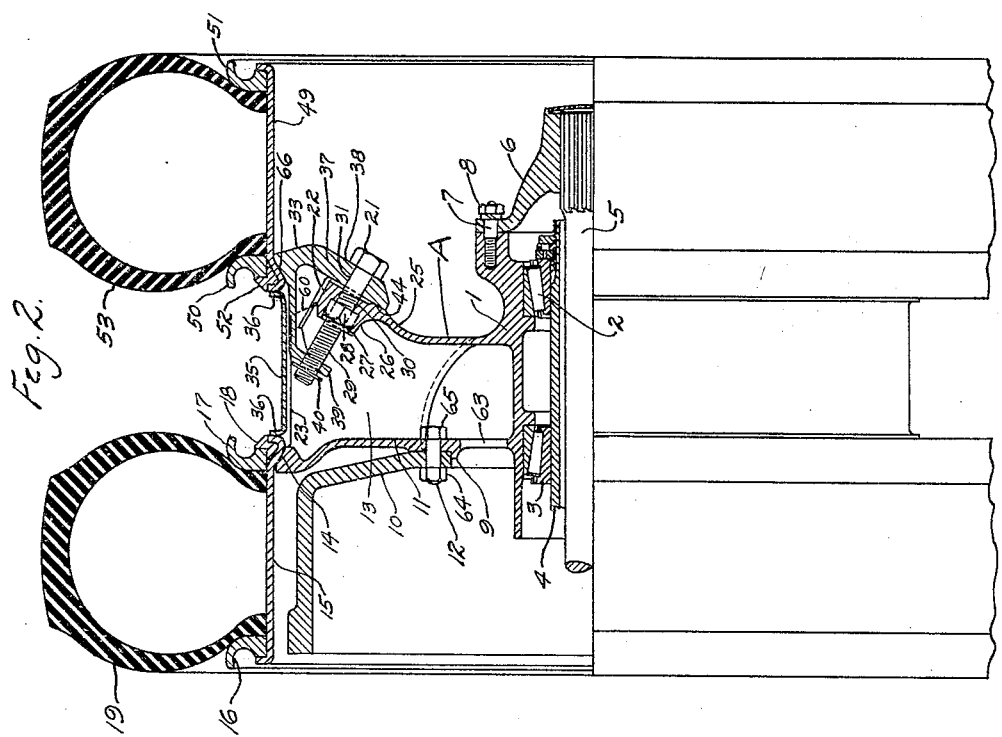
INVENTOR
Elmer F. Waterbor,
BY George B. Ingersoll
ATTORNEY May 30, 1933.  E. F. WATERBOR  1,912,110
VEHICLE WHEEL
Filed June 6, 1931  3 Sheets-Sheet 3
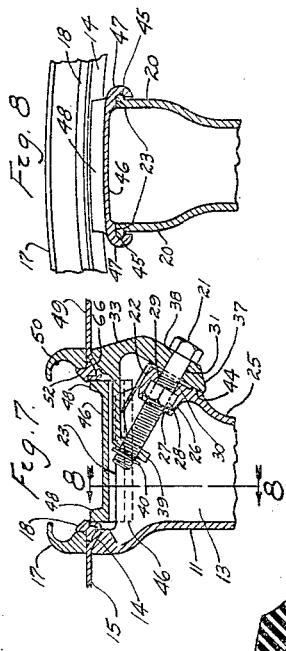
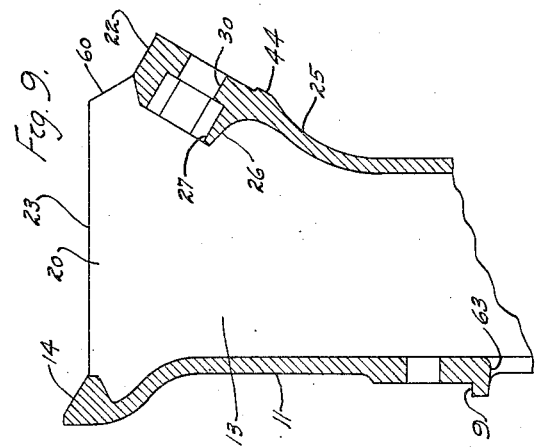
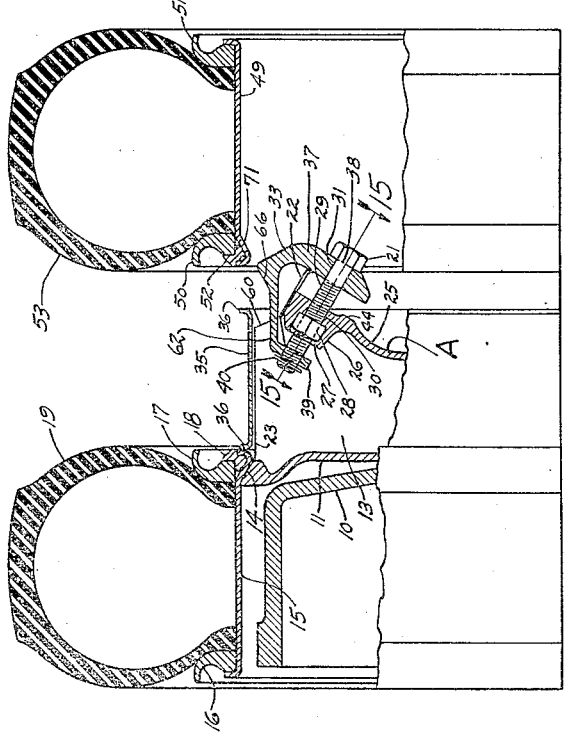
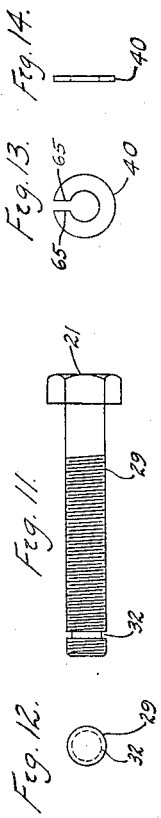
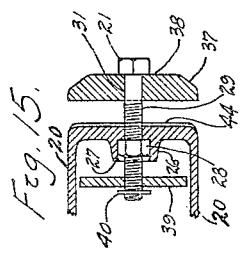
INVENTOR.
Elmer F. Waterbor
BY
George B. Ingersoll,
ATTORNEY.

Patented May 30, 1933

1,912,110

UNITED STATES PATENT OFFICE

ELMER F. WATERBOR, OF DETROIT, MICHIGAN, ASSIGNOR TO MICHIGAN MALLEABLE IRON CO., OF DETROIT, MICHIGAN, A CORPORATION OF MICHIGAN

VEHICLE WHEEL

Application filed June 6, 1931. Serial No. 542,544.

My invention relates to improvements in vehicle wheels as used on motor vehicles and particularly to wheels for the installation of dual tires and rim equipment and objects of my improvements are, first, to provide a vehicle wheel having a clamp member for clamping both of the dual tire and rim equipments in position; second, to provide a dual rim equipment clamp member having positive means for returning said member to a non-clamping position; third, to provide a vehicle wheel having an angularly inclined clamp member for clamping both of the tire and rim equipments in position; fourth, to provide rim equipment holding means that does not have to be removed from a vehicle wheel while said rim equipment is being removed from the vehicle wheel; and fifth to provide a wedge clamping member for moving radially outwardly and transversely inwardly against the rim equipment of a vehicle wheel.

I attain these objects by the mechanism illustrated in the accompanying drawings, in which—

Figure 1 is a side elevation of the vehicle wheel with dual tires and rim equipment assembled thereon; Fig. 2, a combined sectional and end elevation of the wheel, tires, and rim equipment on the line 2—2, Fig. 1; Fig. 3, a plan view of one of the clamp members; Fig. 4, a sectional view of one of the clamp members on the line 4—4, Fig. 3; Fig. 5, an end elevation of one of the clamp members; Fig. 6, an end elevation of the open end of one of the spokes of the vehicle wheel; Fig. 7, a partial sectional view of one of the wheel spokes and its dual rim equipment spaced by an individual spacer at the end of each spoke; Fig. 8, a sectional view of a spoke end and a spacer member on the line 8—8, Fig. 7; Fig. 9, a partial vertical section of one of the hollow spokes; Fig. 10, a sectional view disclosing the position of one of the wedge clamps when the dual tire and rim equipment is being removed from the vehicle wheel; Fig. 11, a side elevation of one of the clamping bolts; Fig. 12, an end elevation of one of the clamping bolts; Fig. 13, a side elevation of one of the clamp return washers; Fig. 14, a side elevation of one of the clamp return washers; and Fig. 15, a sectional view on the line 15—15, Fig. 10.

Similar numerals refer to similar parts throughout the several views.

The wheel assembly A is provided with a hub 1 mounted on the bearings 2 and 3 which are in turn suitably mounted on an axle housing of an automative vehicle, a portion of the axle housing being disclosed at 4. The axle drive shaft 5 is splined, at its outer end, into the driving flange 6, the driving flange 6 being secured to the hub 1 by the studs 7 and the nuts 8. The hub 1 is provided with a pilot portion 9 on which fits the brake drum 10. The wheel assembly A is provided with a plurality of hollow spokes 11 which radiate from the hub 1 and through the inboard wall of which extend the bolts 12 for fastening the brake drum 10 in its assembled position on the wheel assembly A, the bolts 12 being fastened by the nuts 64.

The hollow spokes 11 terminate at their outer extremities in the open ends 13. At the inboard side of the ends of each hollow spoke 11 is an angular surface 14 which is machined concentric with the bearing bores of the hub 1 and engages a similar angular surface on the inboard rim base 15. The rim base 15 supports the locking flanges 16 and 17, the lock ring 18, and the inboard tire 19. The hollow spokes 11 are provided with the transversely extending walls 20 between the ends of which are the inclined surfaces 22, the surfaces 22 being constructed concentrically with the bearing bores of the hub 1.

The outside walls 25 of the hollow spokes 11 are inclined and are provided with the bosses 26 at points adjacent the outer ends of the hollow spokes 11. The bosses 26 are provided with the recesses 27 which may be formed to the necessary shape and size to loosely fit around the nut 28 through which the bolt 29 passes, the bolt 29 also passing through the hole 30 in the outboard wall of the hollow spoke 11 and the hole 31 of the wedge clamp 33, the head 21 of the bolt 29 engaging the outboard surface 38 of the boss 37 of the wedge clamp 33. The bosses 26 may extend slightly above the top of the head 28 and thus provide for the edges of the recesses 27 to be peened or riveted around the top of the nuts 28 and thus retain the nuts loosely within the recesses 27. The head 21 can then be used to operate the bolt 29 without the necessity of holding the nut 28 with a wrench or similar kind of tool.

The convex surfaces 22 of the spokes 11 extend across the longitudinal width of the hollow spoke 11. The wedge clamp 33 is assembled within the open end of each of the hollow spokes 11, the wedge clamps 33 each being provided with inclined concave surfaces 34, at each of its sides, which slidably contact the convex surfaces 22 of the hollow spoke 11.

The wedge clamps 33 are also provided with bosses 39 extending below the peripheral surfaces 23 of the transversely extending walls 20 of the hollow spokes 11. The retaining washer 40 is secured within the groove 32 of the bolts 29, the washer 40 having the open ends 65 which thus provide for spreading of the washer 40 to permit assembly in the groove 32.

The wedge clamps 33 are each further provided with the inclined surfaces 66, each of said surfaces 66 being formed concentrically with the bores of the bearings 2 and 3 in the hub 1. The inclined surface 66 of the wedge clamps 33 conform and engage with the radially inwardly facing surface 71 of the outer rim base 49.

The outer rim base 49 supports the locking flanges 50 and 51, the lock ring 52, and the outboard tire 53.

It is to be noted that when the bolt 29 is turned in the nut 28, the head 21 of the bolt 29, will force the wedge clamp 33 radially outwardly and transversely inwardly, the inclined and concave surfaces 34 of the wedge clamp 33 slidably engaging the outboard inclined and convex surface 22 of the hollow spoke 11, the wedge clamp 33 moving radially outwardly and transversely inwardly until the inclined surface 66 of the wedge clamp 33 engages the radially inwardly facing surface 71 of the outboard rim base 49, thus causing the rim base 49 to be moved transversely inwardly until its transversely inner face contacts with the spacer member 35, thus further causing the transversely inner face of the spacer member 35 to engage the transversely outer face of the inboard rim base 15, the inboard rim base 15 thus being wedged on to the angular surface 14 at the inboard side of the ends of each hollow spoke 11. The spacer member 35 may thus encircle the ends of the hollow spokes 11, the spacer member 35 being slidably mounted on the surfaces 23 of the hollow spokes 11. The spacer member 35 may be provided with the flanges 36 for providing radial strength and also for contacting the surfaces of the rim bases 15 and 49. The spacer member 35 thus provides accurate spacing for the rim bases 15 and 49.

It is to be noted that the wedge clamp 33 will wedge itself between the convex and inclined surfaces 22, of the hollow spokes 11 and the outboard rim base 49, thus causing a powerful wedging action to maintain the inboard and outboard rim bases 15 and 49 in their spaced positions and at the same time providing for the absorption of the radial thrust loads on the outboard rim base 49 to be taken on the inclined and convex surface 22 of the wall surface 25 and the absorption of the radial thrust loads on the inboard rim base 15 to be taken on the angular surfaces 14 of the hollow spoke 11. When the inner and outboard rim bases 15 and 49 are being removed from the vehicle wheel, the wedge clamps 33 will move radially inwardly and transversely outwardly until they occupy the position as disclosed in Fig. 10 in which the surface 70 will be below or within the minimum radially inwardly facing diameters of the rim bases 15 and 49, thus allowing the rim bases 15 and 49 to be removed from their clamped positions on the ends of the hollow spokes 11 and the wedge clamps 33 without removing the wedge clamps from the vehicle wheel assembly.

It is also to be noted that when the portion of an automotive vehicle, to which the vehicle wheel is connected is lifted or jacked up to permit the vehicle wheel to be free of the ground, the rim clamps 33, when loosened and on the under portion of the vehicle wheel, will be prevented, from dropping off, by the bolt 29 engaging the hole 41 of the boss 39 of the wedge clamp 33.

The wedge clamps 33 will also be guided and positioned centrally, with respect to the open end of the hollow spoke 11, in its angular movement by the convex surface 22 engaging the concave surface 34 of the wedge clamps 33, the surfaces 22 and 34 being formed concentrically with the bearing bores 2 and 3 of the hub 1.

It is to be further noted that the spokes 11 will be provided with inclined surfaces 60 at the outside corner or periphery of its wall portions 20, the inclined surfaces 60 being located between the convex surfaces 22 and the peripheral surfaces 23 of the walls 20, the inclined surfaces 60 being continuations of the walls 20.

It is also to be noted that when the bolt 29 is turned in the nut 28 so as to cause the wedge clamp 33 to move radially inwardly and transversely outwardly from its wedgingly clamped position as disclosed in Fig. 2 to its position in which the rim bases 15 and 49 are being removed from the wheel, as disclosed in Fig. 10, the washer 40 will engage the inboard surface of the boss 39 of the wedge clamp 33 and positively cause the wedge clamp 33 to follow the head 21 of the bolt 29 in its radially inwardly and transversely outwardly travel. The walls 25 of the spokes 11 are each further provided with a boss portion 44 which engages the inboard surface of the boss 37 of the wedge clamp 33 at a point so located in reference to the hole 30 as to insure the wedge clamp 33 acting as a lever to further increase the wedging and clamping efficiency of the wedge clamp 33.

When it is desired to use individual spacing means at the periphery of each spoke 11, the spoke may be provided with beads 45 extending along the edge of the transversely extending walls 20 over which may be slidably assembled the spacer members 46 having boss portions 47 for fitting over the beads 45, as disclosed in Figs. 7 and 8. The spacer members 46 may be provided with bosses 48 for engaging the rim members 15 and 49. The surfaces 62 of the wedge clamps 33 may be so located as to move to a position adjacent but not clamping the spacer members 35 or 46.

The hollow spokes 11 are provided with openings at 63 in the inboard walls at a point adjacent the barrel portion of the hub 1, thus permitting the use and assembly of the short bolts 12 for fastening the brake drum 10 in assembly with spokes 11 of the wheel assembly A, the head 65 of the bolts 12 thus being hidden from view from the outboard side of the wheel assembly A.

I claim

1. In a vehicle wheel, the combination of a spoke having an open end provided with an outboard wall, a wedge member suitably mounted partially within the open end of said spoke, a pair of rim members, and means for forcing said wedge member radially outwardly and transversely inwardly against the outboard of said rim members, said means extending through the outboard wall of said spoke, said means having oppositely disposed ends, relative to the outboard wall of said spoke, each of said ends being engaged by said wedge member.

2. In a vehicle wheel, the combination of a hollow spoke having an outboard wall with an opening therethrough, said opening having its axis inclined relative to the axis of the vehicle wheel, a wedge clamp mounted on the periphery of the outboard wall of said hollow spoke, said wedge clamp having a pair of bosses disposed on opposite sides of said outboard wall, and a member operatively connecting the pair of bosses of said wedge clamp with said outboard wall, said member extending through the opening of said outboard wall.

3. In a vehicle wheel provided with spokes having outboard walls, the combination of a pair of rim members, a spacer member between said rim members, a movably mounted clamp member on said spokes for retaining said rim members and said spacer member on said vehicle wheel, said clamp member being provided with a pair of bosses located on opposite sides of one of the outboard walls of said spoke, one of said bosses being further located adjacent the lateral center of said spacer member, and means for movably operating said clamp, said means engaging the bosses of said clamp member, said means extending through the outboard wall of said spoke.

4. In a vehicle wheel, the combination of a spoke having wall portions provided with laterally extending surfaces at the periphery of said spoke, a transversely outwardly extending peripheral surface at the inboard side of the wall portions of said spoke, said transversely outwardly extending peripheral surface being concentric with the axis of said wheel, a transversely outwardly extending surface at the outboard side of the wall portions of said spoke, said last mentioned surface being concentric with the axis of said wheel, rim members, and means for clamping said rim members on said spoke of the vehicle wheel, said means including a wedge clamp having bosses extending radially inwardly on opposite sides of the outboard wall of said spoke, said wedge clamp being provided with a surface between its radially inwardly extending bosses, for engaging said transversely outwardly extending surface at the outboard side of said spoke, said means further including a member for operatively engaging the radially inwardly extending bosses of said wedge clamp.

5. In a vehicle wheel, the combination of a spoke having side walls, said spoke being provided with a transversely outwardly extending surface at the periphery of its outboard wall, a clamping member slidably mounted on the transversely outwardly extending surface of said spoke, said clamping member being provided with a pair of bosses extending radially inwardly on each side of the outboard wall of said spoke, and means for moving said clamping member, said means engaging the pair of bosses of said clamping member.

6. In a vehicle wheel, the combination of a spoke having an outboard wall having a peripheral angular surface located concentrically with the axis of the vehicle wheel, the outboard wall of said spoke being further provided with a boss adjacent its peripheral angular surface, a rotatable member mounted in the boss of said spoke, the axis of said rotatable member extending parallel with the angle of said peripheral surface, and a clamping member slidably mounted on the peripheral angular surface of said spoke, said clamping member engaging opposite end portions of said rotatable member.

7. In a vehicle wheel having hollow spokes provided with an inclined bearing surface for a rim together with transversely extending side walls and an inclined peripheral surface at the outboard ends of said side walls, the combination of a clamp member provided with a bearing surface for a rim, said clamp member being slidably mounted on the inclined peripheral surface at the ends of said side walls of said spokes, rim members engaging said bearing surface of said clamp member and the first mentioned inclined bearing surface of said spokes, a spacer member between said rim members, said spacer member fitting over the laterally inner portion of said clamp member, said spacer member fitting over the transversely extending walls of said spokes, and means for wedging said clamp member between said spokes and one of said rim members, said means extending through both ends of said clamp member.

8. In a vehicle wheel, the combination of spokes provided with inclined bearing surfaces at their inboard sides, a pair of rim members, a spacer member between said rim members, a wedge member slidably mounted on each of said spokes, said wedge member being provided with radially inwardly facing surfaces inclined relative to the axis of the vehicle wheel, said wedge members having a laterally inner portion extending within said spokes, and means adapted to move said rim members and said spacer member toward the inclined bearing surface at the inboard side of said spokes.

9. In a vehicle wheel, the combination of a spoke having inboard and outboard walls each provided with a peripheral portion having an angular surface extending in a plane intersecting the axis of the wheel at points located transversely outwardly from said spoke, a wedge member movably mounted on the angular surface of the outboard wall of said spoke, said wedge member being provided with a radially inwardly extending boss located transversely inwardly of said outboard wall, said wedge member being further provided with a radially inwardly extending boss located transversely outwardly of said outboard wall, and means for actuating said wedge member, said means engaging the radially inwardly extending bosses of said wedge member, said means extending through the outboard wall of said spoke.

10. In a vehicle wheel, the combination of a spoke having an inclined surface located at the periphery of a wall portion of said spoke, a wedge clamp mounted on the inclined surface of said spoke, said wedge clamp being provided with a pair of bosses extending radially inwardly on opposite sides of the inclined surface of said spoke, and revolvable means for moving said wedge clamp, said revolvable means engaging the pair of bosses of said wedge clamp.

11. In a vehicle wheel, the combination of a clamp suitably supported at the outboard side of the wheel to move at an angle with the axis of the wheel, said clamp being provided with a pair of radially inwardly extending bosses, and means for moving said clamp, said means being provided with shoulder portions for engaging the outside surfaces of each of the pair of bosses of said clamp.

12. In a vehicle wheel, the combination of a spoke having an outboard wall portion with a recess therein, a threaded member extending through the outboard wall portion only of said spoke, a nut member loosely retained within the recess of the outboard wall portion of said spoke, said nut engaging said threaded member, a wedge member suitably mounted on the outboard portion of said spoke, said wedge member extending radially inwardly on opposite sides of the outboard wall portion of said spoke, said wedge member engaging said threaded member, and a washer engaging said wedge member, said washer being retained on said threaded member, said washer being adapted to move said wedge member radially inwardly.

13. In a vehicle wheel, the combination of a spoke member having an outboard wall provided with an inclined peripheral surface, a wedge member slidably mounted on the inclined peripheral surface of said spoke, said wedge member having radially inwardly extending portions adjacent both the inside and outside surfaces of the outboard wall of said spoke, and means for moving said wedge member, said means extending through the outboard wall of said spoke and both of the radially inwardly extending portions of said wedge member.

14. In a vehicle wheel, the combination of a spoke having a wall portion having an inclined peripheral surface, a threaded member revolvably mounted in the wall portion of said spoke, said threaded member being provided with a head portion located at one side of said wall portion together with a shoulder portion located at the opposite side of said wall portion, and a clamp provided with converging surfaces, said clamp being slidably mounted on the inclined peripheral surface of the wall portion of said spoke, said clamp engaging the head portion together with the shoulder portion of said threaded member.

15. In a vehicle wheel, the combination of a spoke having a wall portion provided with an inclined peripheral surface, a rim member, a clamping member for said rim member, said clamping member being provided with a pair of converging surfaces, said clamping member having one of its converging surfaces contacting the inclined peripheral surface of the wall portion of said spoke, and a bolt member revolvably mounted in the wall portion of said spoke, said bolt member having portions adjacent each of its ends for contacting said clamp member, the axis of said bolt member being disposed at an angle relative to the axis of the vehicle wheel.

Detroit, Michigan, May 20, 1931.

ELMER F. WATERBOR.